(No Model.) 2 Sheets—Sheet 1.
C. B. GLOVER.
MACHINE FOR REMOVING MUD OR SAND FROM RIVERS OR HARBORS.
No. 490,747. Patented Jan. 31, 1893.
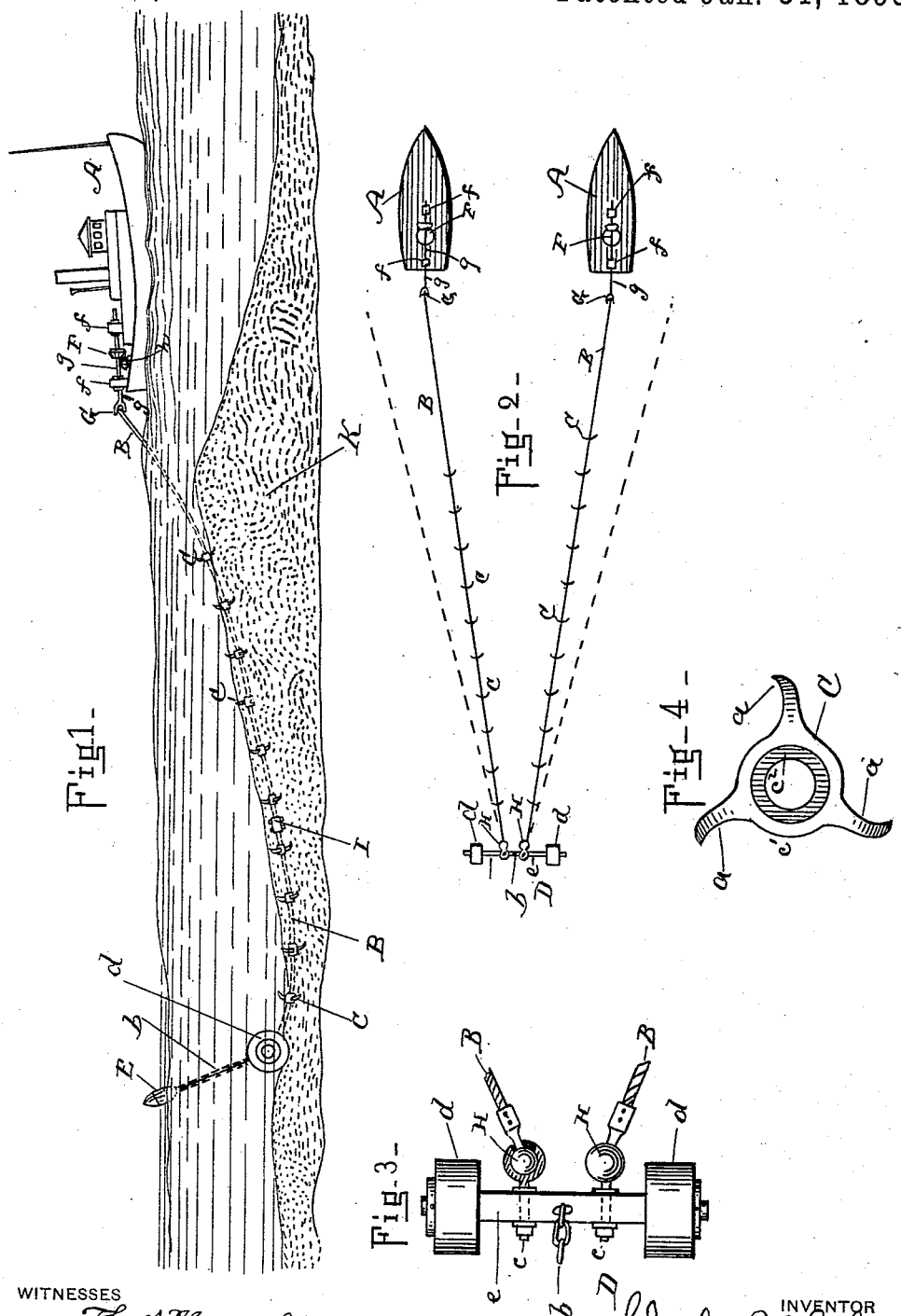
WITNESSES
Thos Houghton.
Jami H. Jacobson
INVENTOR
Charles B Glover
By Lewis Abraham
His Atty.

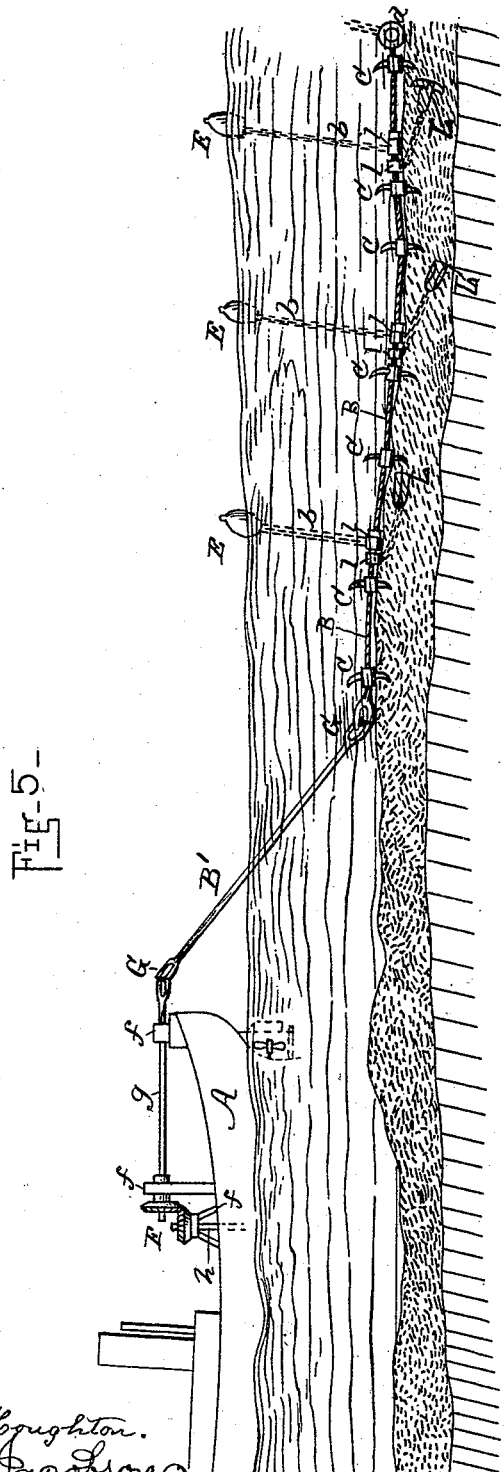

United States Patent Office.

CHARLES B. GLOVER, OF HOUSTON, TEXAS.

MACHINE FOR REMOVING MUD OR SAND FROM RIVERS OR HARBORS.

SPECIFICATION forming part of Letters Patent No. 490,747, dated January 31, 1893.

Application filed January 13, 1892. Renewed November 22, 1892. Serial No. 452,767. (No model.)

*To all whom it may concern:* from which extend radially pointed blades, $a$, from the counter shaft on the tug, and connected to it and to the cable, B, by a universal joint. In this case, anchors, L, are employed to hold the cable down, these anchors being each connected to a separate sleeve within which the cable is free to turn. It will also be preferably practicable and useful to employ a series of buoys, E, having chains, $b$, connected to sleeves, $l$, through which the cable can turn freely, whereby the position of the cable can be determined as the device is operated. It will thus be seen that as the cable is drawn along by the tug or tugs, and revolved, the blades of the agitators thereon will loosen the mud or sand and place it in condition to be carried away by the current.

Besides agitating and scouring water beds so as to loosen the mass in condition to be carried away naturally by current or tide, the treatment of the sub-aqueous deposits, in the manner set forth, by means of my invention, will have the effect to separate and comminute such deposits of sand, mud, or other material which will thus be completely disintegrated, so that any portions not carried away by natural action of the water, will be in condition to be easily removed by any suitable form of ditching or dredging device.

Having now fully described my invention, and the manner of its operation, what I claim and desire to secure by Letters Patent of the United States of America, is;—

1. In a device for deepening or widening channels of rivers or harbors, a cable provided with revoluble agitators or cutters rigidly connected thereto, a truck connected to the trailing end of the cable by a ball and socket connection, substantially as and for the purpose set forth.

2. In a device for widening or deepening the channels of rivers or harbors, a cable having agitators rigidly connected thereto at intervals throughout its length, a truck connected thereto by the ball and socket joints, and a buoy attached to the truck, substantially as and for the purpose set forth.

3. In a device for widening or deepening channels of rivers and harbors, a cable having agitators attached thereto, a trailing truck to which the cable is connected through a ball and socket joint, a counter shaft on the tug, and universal joint connection between the cable and shaft, substantially as and for the purpose set forth.

4. In a device for widening and deepening the beds of water courses, pairs of cables, B, supplied at intervals of their length with agitators, C, having radially extending from central plate, $c'$, a series of curved pointed blades, $a$, the forward end of each chain being connected by universal joint to a shaft operated by suitable gearing on steam tugs the opposite ends of the chains each connected by ball and socket to trailing truck, D, said cables being provided with anchors, L, and buoys, E, all in combination with tugs, A, whereby through operative gearing on the tugs, the cables and connections can be propelled in any direction and revoluble motion imparted thereto, as and for the purpose intended, substantially as described.

5. In a device for scouring and loosening beds of water courses, the combination of shaft, B', having attached thereto by universal joint, cable, B, provided with fixed agitators, C, and loosely attached buoys, E, and anchors, L, with countershaft, $g$ geared to main shaft, $h$, of steam tug, whereby when motion is imparted thereto said cable and its attached agitators will revolve, substantially as described.

In testimony that I claim the invention above set forth I affix my signature in presence of two witnesses.

CHARLES B. GLOVER.

Witnesses:
 F. F. CHEW,
 IRA P. JONES.